2,895,844
ACETOACETIC ACID ESTERS OF CASTOR OIL AND THE USE THEREOF IN PLASTICIZATION

Alfred R. Bader, Milwaukee, Wis., and Henry A. Vogel, Gibsonia, Pa., assignors to Pittsburgh Plate Glass Company No Drawing. Application November 12, 1954
Serial No. 468,556

3 Claims. (Cl. 106—195)

This invention relates to beta-keto esters of castor oil and to the use thereof in the plasticization of resins and it has particular relation to the use of said beta-keto esters in the plasticization of nitrocellulose and other plastic materials.

It has heretofore been recognized that valuable plastic could be formed by incorporation of plasticizing agents, such as so-called oil plasticizers, namely castor oil; or chemical plasticizers, such as esters of phthalic acid, into nitrocellulose and other plastic materials. The resultant materials were valuable resins in the molding arts and for forming films, such as photographic films. They were also dissolved in appropriate solvents, such as acetone; esters, such as amyl acetate, or ethyl acetate; hydroxy ethers, such as monoethers of ethylene glycol, or diethylene glycol, or the like, with or without pigments to provide solutions which could be applied as lacquers to surfaces of various materials, such as wood, metal or the like, and dried by evaporation of solvents to form adherent protective and/or decorative films. Such systems have been extensively used in the coating and molding arts. However, they were not always entirely satisfactory. For example, it has been recognized that the "oil plasticizers," such as castor oil, exhibited a pronounced tendency to sweat out or migrate during aging, especially if exposed to elevated temperatures. Chemical plasticizers, such as the phthalic acid esters, e.g., diethyl phthalate or dibutyl phthalate, were not entirely satisfactory, inasmuch as the esters tended to be volatile and during the course of the aging of the films, the plasticizers gradually evaporated, leaving the films unplasticized and of course highly embrittled.

It has now been discovered that the acetoacetic acid esters of hydroxylated fatty acids and glycerol and more particularly the acetoacetic acid esters of castor oil are highly meritorious plasticizers of plastic and particularly of nitrocellulose. These plasticizers are in many respects superior to such standard materials as castor oil and the esters of phthalic acid, since they do not sweat out or migrate, at least to a substantial degree and they are relatively non-volatile.

Castor oil, as is well known, contains free hydroxyls, since it consists largely of triglycerides of ricinoleic acid (12-hydroxy-9,10-octadecenoic acid). Esters of acetoacetic acid and castor oil may be prepared by various methods. However, the method disclosed in Patent 2,693,484 issued to applicants and another as of November 2, 1954, is satisfactory. This method broadly involves mixing castor oil with a lower ester (e.g., methyl or ethyl ester) of acetoacetic acid and heating the mixture at ester interchange temperatures (e.g., 75° C. to 125° C.). Acetoacetic acid esters of castor oil are formed by exchange of castor oil radicals for alkyl groups of the acetoacetic acid ester, and lower alcohol is evolved, preferably being removed as it is formed. The ester interchange reaction involves the hydroxyl group of the ricinoleic acid radicals.

Still another simple method of forming acetoacetic acid esters of castor oil comprises reacting castor oil in approximately stoichiometric amount with diketene. This reaction proceeds at room temperature and may be accelerated by heating or by the addition of a small amount of a mild catalyst.

This latter reaction is illustrated as follows:

Mix 31 grams of pure castor oil with 8.4 grams diketene and 0.2 gram pyridene (catalyst) dissolved in 100 milliliters of toluene. Heat the mixture on a steam bath over night and strip under vacuum to remove volatile components. The yield is 39 grams of faintly yellow, substantially pure castor oil acetoacetate suitable for use as a plasticizer for nitrocellulose, in accordance with the provisions of this invention.

When plasticizing nitrocellulose the acetoacetic acid esters may be employed in a range of about 5 to 200 parts per part of nitrocellulose. The plasticization of nitrocellulose with acetoacetic acid esters of castor oil may be effected by various techniques well understood in the art. For example, the two materials may be milled together in a pebble mill or other suitable device. However, it is more common to incorporate the plasticizer into a solution of nitrocellulose and an appropriate solvent system therefor. Solvent systems for nitrocellulose include active solvents with or without addition of latent solvents and with or without additions of diluents.

Active solvents of nitrocellulose which may be employed in the preparation of solutions for plasticization, in accordance with the provisions of the present invention, include a relatively large class of liquid media such as:

Ketones such as,
    Methyl ethyl ketone
    Acetone

Esters such as,
    Methyl acetate
    Isopropyl acetate
    Isobutyl acetate
    Butyl acetate
    Amyl acetate
    Secondary amyl acetate
    Butyl propionate Monoethers of ethylene glycol such as,
    Monomethyl ether of ethylene glycol
    Monoethyl ether of ethylene glycol
    Monobutyl ether of ethylene glycol.

Numerous other solvents are available.

Well recognized latent solvents which may be employed in combination with the foregoing active solvents comprise:

Ethyl alcohol
    Isopropyl alcohol
    Isobutyl alcohol
    Butyl alcohol
    Amyl alcohol Diluents which may be added to the solutions for purposes of extending them comprise the well known hydrocarbons such as:

Benzol
    Toluol
    Xylol
    Aromatic solvent naphtha
    Aliphatic petroleum fractions
    Hydrogenated petroleum fractions Selection of solvents and diluents for the nitrocellulose compositions of this invention preferably is made in accordance with the volatility or speed of drying required in the films after application. In those instances where rapid drying is a prerequisite, highly volatile solvents are employed. On the other hand, in those instances where a slow rate of drying is desirable, less volatile solvents should be employed. Amounts of solvent employed will vary, dependent upon the mode of application of the film, temperatures at which the solutions are applied and other factors.

It should be recognized that nitrocellulose lacquers are often modified by incorporation of various resinous materials, such as gum dammar, ester gum, alkyd resins, urea resins, ethyl cellulose and the like. These same modifying materials may be successfully incorporated with nitrocellulose which is plasticized by means of acetoacetic acid esters of castor oil.

It is likewise common to incorporate mixtures of various of the recognized plasticizers in place of single plasticizers. For example, chemical plasticizers including dibutyl phthalate, di-n-octyl phthalate, di-2-ethylhexyl phthalate, diamyl phthalate, tricresyl phosphate, triphenyl phosphate, tributyl phosphate, triacetin, butyl stearate, butyl tartrate, triethylene citrate; or oil plasticizers, such as raw castor oil, linseed oil, tung oil, blown soya oil, blown rapeseed oil, blown wood oil and blown castor oil, may be employed in various combinations of two or more components to obtain special effects. These same plasticizers and mixtures thereof, may also be employed if desired in combination with the acetoacetic acid esters of castor oil in the plasticization of nitrocellulose compositions in accordance with this invention. The added plasticizers may be employed in amounts, for example, of 5 percent to 75 percent of the total weight of the plasticizer mixture.

It is to be recognized that nitrocellulose solutions are sometimes employed as clear films but they are also quite often admixed with coloring agents, such as the well known pigments, such as titanium dioxide, carbon black, lithopone, or the like, in order to impart opacity or a desired color to the films. Nitrocellulose material containing acetoacetic acid esters of castor oil may also be employed as clear solutions or they may be pigmented in the manner characterizing nitrocellulose materials. To obtain pigmentation, the pigmentary material and a solution of the plasticized nitrocellulose are mixed together in an appropriate apparatus, such as a pebble mill or the like.

Nitrocellulose plasticized with acetoacetic acid esters of castor oil may be applied to wood, or metals, such as iron or steel, by the conventional methods. Such methods comprise dipping, brushing, roller coating, or spray coating. Naturally it will be recognized that for these various methods of application, the solutions should be properly thinned with solvents and/or diluents to attain the requisite degree of viscosity adapted for the particular method of application to be employed.

The use of the acetoacetic acid ester of castor oil as a plasticizer for nitrocellulose and the comparison thereof with such standard plasticizers as castor oil and dibutyl phthalate are illustrated by the following examples:

EXAMPLE I

In order to form an ester of castor oil and acetoacetic acid, 800 grams of castor oil and 200 grams of methyl acetoacetate were mixed in a flask provided with an air condenser. The mixture was heated for six hours at 120° C. while being blown gently with inert gas to remove evolved methyl alcohol. Vapors of methyl acetoacetate were condensed and returned during the reaction. At the end of the reaction, the mixture was blown vigorously to remove any volatile matter. The acetoacetic acid esters of castor oil were produced in almost theoretical yield.

Nitrocellulose was dissolved in a blend of ethyl acetate, ethyl alcohol, and methyl ethyl ketone to provide a fluid mixture to which acetoacetic acid esters of castor oil were added and several sets of samples were prepared from the mixture. These were distinguished from each other by variation of the proportion of the plasticizers employed. These sets were as follows:

Set 1

In this set the plasticizers were employed in a ratio of 79 pounds per 100 pounds of nitrocellulose.

Set 2

In this set of samples the plasticizers were employed in a ratio of 112 pounds per 100 pounds of nitrocellulose.

Set 3

In this set the plasticizers were employed in a ratio of 162 pounds per 100 pounds of nitrocellulose.

All of the foregoing samples were well plasticized and were capable of forming useful films upon wood, metal and various other materials. Useful moldings could also be formed therefrom.

Additional sets of samples were respectively plasticized with castor oil and dibutyl phthalate in amounts of 79 pounds per 100 pounds of nitrocellulose. The following comparative tests were conducted upon these samples and the samples of Set 1 of the foregoing:

Glass plates were coated with the materials by means of an appropriate applicator, the thickness of the films being approximately 0.003 inch. The resultant films were air dried and were then examined for such characteristic properties as gloss, clarity, sweat-out, hardness and color retention. Initially all of the films were very nearly identical, all being of good color and having satisfactory Sward hardness values and flexibility.

The several films were then subjected to exposure tests of the so-called accelerated type.

In one of these tests, the panels were baked for 1 hour at 275° F. and were then re-examined.

In the baked films it was found that in the nitrocellulose plasticized with castor oil, a considerable degree of sweating out had occurred. The films containing butyl phthalate as a plasticizer had to a substantial degree lost the latter through evaporation and the films remaining were very brittle. The acetoacetate of castor oil did not sweat out and did not evaporate from those films which were plasticized with it. The films containing it were still well plasticized and of good color after baking.

Films of the foregoing materials were sprayed onto tin panels and were then stripped off for test purposes. The films were exposed to air at 75° C. for 64 hours, at the conclusion of which time, it was found substantially all of the dibutyl phthalate had evaporated from those films which were plasticized with it. Further films were tested for elongation and tensile strength; (a) as initially formed and dried; (b) after exposure at 75° C. for 64 hours and (c) after exposure to a temperature of 275° F. for 1 hour. The toughness factor (T) was calculated from the formulae:

$$T = \frac{ES}{2}$$

where E equals the percent extension of the sample before break and S equals the tensile strength in pounds per square inch. The results of these tests are as follows:

| Plasticizer | Initial | | | 64 hours at 75° C. | | | 1 hour at 275° F. | | |
|---|---|---|---|---|---|---|---|---|---|
| | Percent Elongation E | Tensile S | Toughness T | Percent Elongation E | Tensile S | Toughness T | Percent Elongation E | Tensile S | Toughness T |
| Castor oil | 7.3 | 2,690 | 9,800 | 7.3 | 3,695 | 13,460 | 2.4 | 2,604 | 3,130 |
| Dibutyl phthalate | 33.8 | 708 | 11,970 | (¹) | (¹) | (¹) | (¹) | (¹) | (¹) |
| Acetoacetic ester of castor oil | 6.3 | 1,805 | 5,680 | 12.2 | 2,420 | 14,800 | 8.3 | 3,065 | 12,700 |

¹ Too brittle to test.

From these tests, it will be observed that although dibutyl phthalate plasticized materials were initially of high elongation and high toughness factor, these properties were quickly lost when the films were heated in the accelerated aging test. As previously intimated, those materials plasticized with castor oil tended to lose the latter by migration. However, the elongation, tensile strength and general toughness of the films was better than in the case of those materials plasticized with dibutyl phthalate. On the other hand, in the material plasticized with the acetoacetic acid esters of castor oil the elongation, tensile strength and toughness in every instance was superior to that of the films as initially laid down. The acetoacetic acid esters of castor oil did not sweat out.

EXAMPLE II

In accordance with this example, 50 grams of cold pressed castor oil and 150 grams of methyl acetoacetate were heated in an open-necked glass flask on a steam-bath for 4 hours. The mixture at that point was a clear solution which was stripped of methyl acetoacetate and residual methyl alcohol by distillation at 10 millimeters mercury pressure (absolute) to leave a light yellow oil of a weight of 62 grams. This product is castor oil acetoacetate in which infrared analyses showed the complete absence of hydroxyl groups. A mixed lacquer formulation was prepared comprising:

50 grams of a 35 percent solution of nitrocellulose (12 sec. viscosity) in a mixture of butyl acetate, ethanol, isopropyl acetate, and toluene
10 grams butyl acetate
10 grams castor oil acetoacetate (prepared as above described)

The resultant solution was clear. A film thereof baked on glass for 1½ hours at 100° C. was hard but not brittle. The composition contained 10 grams of plasticizer and 17.5 grams of nitrocellulose.

The material could also successfully be applied as a coating film to wood, iron, steel or the like materials for decorative and/or protective purposes.

EXAMPLE III

In accordance with this example, castor oil acetoacetate prepared as above described is employed as a plasticizer for a vinyl resin, namely, so-called VMCH, which is understood to be a copolymer of 86 parts of vinyl chloride, 13 parts of vinyl acetate, and 1 percent maleic acid. The vinyl resin was employed as a solution of 25 percent solids content in a mixture of methyl isobutyl ketone, methyl ethyl ketone, and toluene. To 50 grams of the foregoing was added 10 grams of castor oil acetoacetate to form a clear solution which when spread as a film on glass and baked for one and one half hours at 110° C., was clear and hard, but not brittle. This material, like the cellulose nitrate, could also be used for coating wood, iron, steel and the like for decorative and/or protective purposes.

EXAMPLE IV

In accordance with this example, nitrocellulose as in Example I was employed. It was mixed with acetoacetic acid esters and saturated alkyd resin, respectively in the proportions of 62 pounds and 56 pounds per 100 pounds of the nitrocellulose employed. This plasticized material was made up as a clear solution and applied to glass panels for testing purposes. The films were found to be well plasticized and the material was apparently suitable for use in coating wood and metals. This mixture illustrates the application of the esters of acetoacetic acid and castor oil to the plasticization of mixtures of nitrocellulose and alkyd resins. It will be apparent that other modifiers of nitrocellulose, such as ester gum, gum dammar and many other resinous materials, might be substituted for the alkyd resin of this example to provide compositions suitable for various applications.

It will be apparent to those skilled in the art that the embodiments of the invention as herein given are by way of illustration and not of limitation. Manifestly various modifications may be made therein, both from the standpoint of proportions of the several components and of substitution of materials, without departure from the spirit of the invention or the scope of the appended claims.

We claim:
1. Nitrocellulose plasticized with the acetoacetic acid ester of castor oil.
2. A solution of nitrocellulose and as a plasticizer therefor, the acetoacetic acid ester of castor oil.
3. A solution of a mixture of nitrocellulose and the acetoacetic acid ester of castor oil in a solvent for nitrocellulose.

References Cited in the file of this patent

UNITED STATES PATENTS

| | | |
|---|---|---|
| 2,500,918 | Reuter | Mar. 14, 1950 |
| 2,693,484 | Cummings | Nov. 2, 1954 |

OTHER REFERENCES

The Condensed Chemical Dictionary, fourth edition (1950), Rheinhold.

Fleck: Plastics—Scientific and Technological, Chemical Publishing Co., Inc. (second, revised edition), 1949, page 343.